(12) United States Patent
Strom

(10) Patent No.: US 9,985,922 B2
(45) Date of Patent: May 29, 2018

(54) SYSTEM AND METHOD FOR MULTI-LANGUAL NETWORKING AND COMMUNICATION

(71) Applicant: GlobeChat, Inc., San Juan Capistrano, CA (US)

(72) Inventor: Kevin Strom, San Juan Capistrano, CA (US)

(73) Assignee: GLOBECHAT, INC., San Juan Capistrano, CA (US)

( * ) Notice: Subject to any disclaimer, the term of this patent is extended or adjusted under 35 U.S.C. 154(b) by 207 days.

(21) Appl. No.: 14/726,318

(22) Filed: May 29, 2015

(65) Prior Publication Data

US 2016/0352674 A1 Dec. 1, 2016

(51) Int. Cl.
*G06Q 10/10* (2012.01)
*H04L 12/58* (2006.01)
*G06F 17/28* (2006.01)

(52) U.S. Cl.
CPC ............ *H04L 51/32* (2013.01); *G06F 17/289* (2013.01)

(58) Field of Classification Search
None
See application file for complete search history.

(56) References Cited

U.S. PATENT DOCUMENTS

| | | | | |
|---|---|---|---|---|
| 7,409,333 B2* | 8/2008 | Wilkinson | ............ | G06F 17/275 704/2 |
| 8,392,173 B2* | 3/2013 | Davis | .................... | G06F 17/275 704/2 |
| 8,494,838 B2* | 7/2013 | Donabedian | .......... | G06F 17/289 704/8 |
| 8,804,574 B2* | 8/2014 | Siomina | .................. | H04W 4/02 370/259 |
| 9,172,671 B2* | 10/2015 | Bates | ...................... | H04L 51/32 |
| 9,231,898 B2* | 1/2016 | Orsini | ..................... | H04L 51/12 |
| 9,262,405 B1* | 2/2016 | Baliga | ................ | G06Q 30/0255 |
| 9,268,762 B2* | 2/2016 | Buryak | ................. | G06F 17/248 |
| 2003/0125927 A1* | 7/2003 | Seme | .................... | G06F 17/289 704/3 |
| 2005/0267738 A1* | 12/2005 | Wilkinson | ............ | G06F 17/275 704/9 |
| 2013/0006602 A1* | 1/2013 | Zhu | ........................ | G06F 17/289 704/2 |

* cited by examiner

*Primary Examiner* — Kenny S Lin
(74) *Attorney, Agent, or Firm* — Knobbe Martens Olson & Bear LLP

(57) ABSTRACT

A method and system are provided that facilitate multilingual communication and international social networking. In one respect, the system and method allow individual social network users to instantly message, or chat, with others in the social network according to personally-selected filters. For example, a user may choose to filter others in the social network by age, gender, location, political preference, relationship status, and even hobbies and interests regardless of any personal acquaintance between the user and filtered members. In another respect, the system and method provide automatic and real-time translation of any text or messages conveyed over the social network so that each user may easily communicate with each other user, regardless of any usual language barriers. Translated text and messages may be further cached in electronically stored memory for ease of future translation.

18 Claims, 7 Drawing Sheets

US 9,985,922 B2

SYSTEM AND METHOD FOR MULTI-LANGUAL NETWORKING AND COMMUNICATION

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material that is subject to copyright protection. This patent document may show and/or describe matter that is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to social networking and, more particularly, to computer implemented systems and methods for facilitating global communication with real time text translation.

BACKGROUND

As the field of wireless technology has advanced, social networking and online communication have become ubiquitous. Indeed, together, wireless computing devices and the web-based social networks enabled by such devices have allowed individuals from all corners of the globe to remain in contact with and even meet one another. Unfortunately, such contact is often limited by natural language barriers that prevent social networkers from effectively corresponding with and understanding one another. As such, social networks have thus far failed to connect international strangers with each other and the opportunity to engage in valuable, real-time communication with such international strangers is severely limited.

Some solutions have been proposed to solve this problem. For example, U.S. Pat. No. 8,271,260 to Wong et al. allows users of a social network to request translations for specific content provided on their social networking feeds. U.S. Pat. No. 8,983,850 to Hale et al., discloses a method of instantaneously translating text sent over instant messaging networks. This disclosure purports to aid one-to-one communication between established acquaintances. U.S. Appln. No. 2013/0030789 filed by Dalce even teaches a voice recognition module adapted to translate spoken languages for ease of communication.

Although such proposals ease some of the difficulties associated with communicating across different languages, they remain deficient. In one respect, this is because communicating members must opt in to the translation service by either affirmatively requesting a translation of some communicated message or affirmatively selecting a partner for communication from among established acquaintances. No solution exists which instead allows a user of a social network to selectively filter all members of a given social network, including strangers and acquaintances alike, to facilitate communication with any or all individuals according to the user's particular interests further independent of any need to consider whether a language barrier may prevent such communication. This may be a particular problem in a contemporary global economy and up-to-the-minute news cycle which thrives on real-time communication with remote witnesses and others at the scene of events who may not always be acquainted with one another.

Although various proposals have been made to solve the aforementioned problems, none of those in existence combine the characteristics of the present invention. Therefore, there is a need for a global social network platforms to seamlessly connect strangers and acquaintances alike with automatic, real-time, and multi-language translation.

SUMMARY

The present disclosure is directed to methods and systems that facilitate social networking and wireless communication among network members all over the world. Indeed, by providing the opportunity to filter network members according to various indicators such as age, location, and interests, as well as displaying automatic, real-time translations of any submitted text in each network member's preferred language, such methods and systems may allow members who might have otherwise foregone opportunities to connect with international and national strangers in light of the usual language barriers. Indeed, it is contemplated that the system and method may enable individuals located anywhere in the world to connect to others via communicatively linked mobile electronic devices regardless of language or location.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In accordance with one embodiment the system and method allow individual social network users to filter others in the social network according to various individual information supplied by each member of the social network. For example, the system may receive instructions to filter the social network and display only those members of a specified age or age range, gender, sexual orientation, relationship and/or familial status, from a particularized geographical location or region, holding specified religious and/or political beliefs, having attained a certain level of education, or even with a specific career, hobbies, interests, and more.

Having filtered members of the social network according to instructions received from an individual social network member, the system may then receive instructions to transmit messages from the individual to one or more of the filtered members, as in an instant message or chat room. It is contemplated that such filtering may be performed, and thus such chat rooms may be formed, regardless of any personal acquaintance between the user and filtered members. Of course, it is even further contemplated that the system may present social network members with preformed chat rooms. For example, the system may receive instructions from social network members electing to join a chat room relating to a newsworthy event. As another example, the system may receive instructions from social network members electing to join a chat room relating to a celebrity.

It should be noted that one skilled in the art will recognize that the specificity of such network filtering and even chat room topic may vary. Indeed the system may receive instructions to filter the social network very narrowly, very broadly, or to some intermediary extent. One skilled in the art will further recognize that such a filtering process may be displayed by the mobile device in various manners. For example, the results of the filtering process may be displayed as a grid, list, or even map. The mobile electronic device may even be operative to alter the display according to preferences received from a each individual social network member. As such, the foregoing is offered simply by way of example and not of limitation.

In addition to filtering social network members, the system and method may provide automatic and real-time translation of any text or messages conveyed over the social network in instant messages or chat rooms so that each member may easily communicate with each other member regardless of any language barriers known to be encountered social networks and other forums for communication.

With respect to the translating step in particular, the mobile electronic device may be operative to determine which languages are preferred by each participant in a given chat room. For example, in the event that a chat room comprises three individual members of the social network, the mobile device may determine that the individual information supplied by a first chat room participant indicates that the first participant's preferred language is English, the individual information supplied by a second chat room participant indicates that the second participant's preferred language is Spanish, and the individual information supplied by a third chat room participant indicates that the third participant's preferred language is French. Of course, such individual information is offered by way of example only and not by limitation. The number of members participating in a chat room may be fewer or greater than three, and the languages preferred by each member may be those other than or including English, Spanish, and French.

When the mobile device receives instructions to transmit a text-based message from the first participant, the mobile device may determine whether the preferred language of any additional, or receiving, participants is the same as or different from the language preferred by the first participant. In accordance with the example given, the mobile device may determine that the second participant's preferred language is different than that of the first participant's. In such a case, the mobile device may be operative to translate the first participant's message into the language preferred by the second participant so that when the second participant receives the transmitted message, it may be displayed in a language that he is capable of understanding. Of course, one skilled in the art will recognize that translation may occur so that a third participant, fourth participant, and any other participants each receive a message displayed in their own preferred language. Likewise, when the first participant receives a message from any other participants in a chat room, the message displayed by his own mobile electronic device may be in his own preferred language so that he is capable of understanding messages transmitted by others regardless of their own preferred languages.

In some embodiments, translated text and messages may be cached and stored in an electronic memory to facilitate translation of future, similar messages. When a mobile device receives instructions, for example, to send a message which is already stored in the cache and translated into the language preferred by any receiving participants, the translating step may be entirely passed over, and the cached translation of the message may be sent.

It is further contemplated that multimedia messages comprising photos, videos, and even audio tracks, either live or from a recording, may be transmitted and received in the social network by the mobile electronic devices.

Thus it is an object of the invention to provide a globally applicable system and method for social networking.

It is a further object of the invention to facilitate communication among members of a social network regardless of limitations traditionally occurring as a result of natural language and geographical barriers.

It is still a further object of the invention to provide an intuitively navigable graphical display interface allowing social network members to elect to participate in private or public one-on-one chats, group chats in chat rooms, and even global chats relating to various public and/or private issues and interests from anywhere in the world.

It is yet another object of the invention to automatically translate any transmissions across the social network so that each individual social network member experiences a display in his or her own preferred language.

One or more of the above-disclosed embodiments, in addition to certain alternatives, are provided in further detail below with reference to the attached figures. The disclosed subject matter is not, however, limited to any particular embodiment disclosed.

Figure 1:
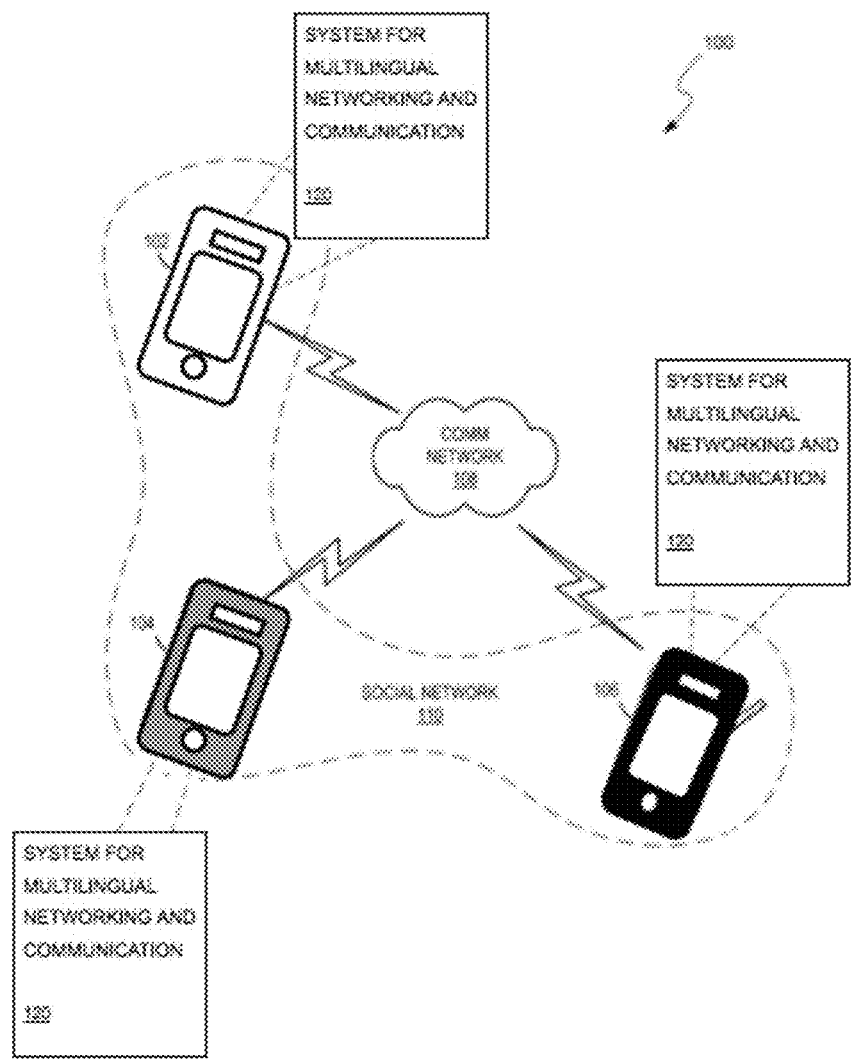
FIG. 1 is a blocked diagram of a networked environment in which an exemplary embodiment of a system for global networking and communication is implemented.
Figure 2A:
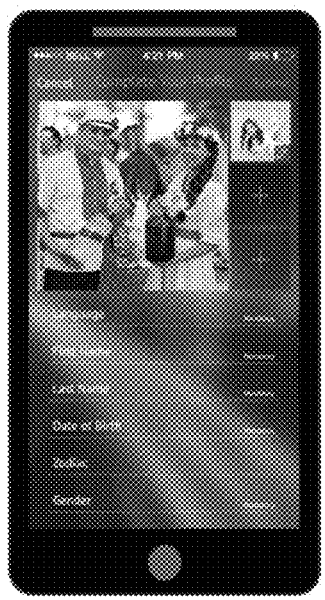
FIGS. 2A-D illustrate exemplary user interfaces implemented by the mobile electronic devices of FIG. 1.
Figure 2B:
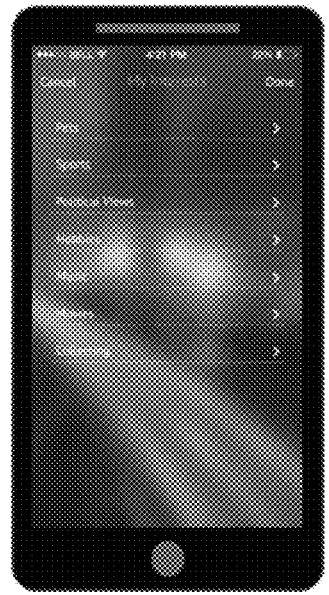
Figure 2C:
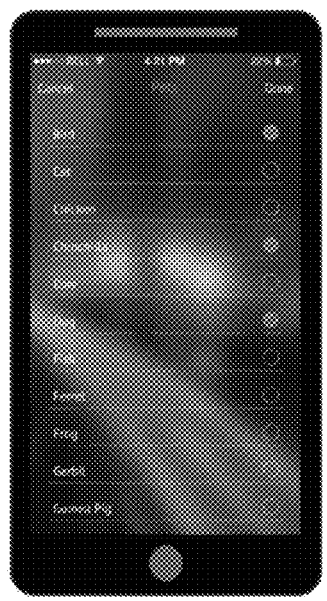
Figure 2D:
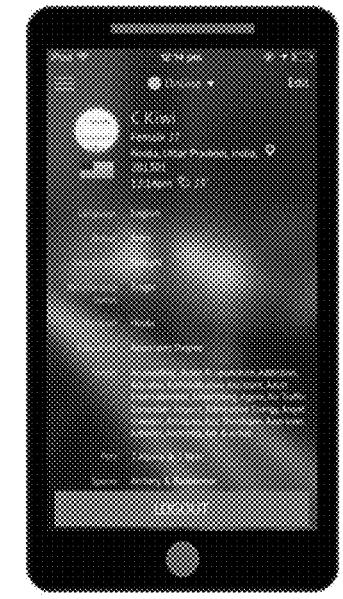

The disclosed embodiments may be better understood by referring to the figures in the attached drawings, as provided below. The attached figures are provided as non-limiting examples for providing an enabling description of the method and system claimed. Attention is called to the fact, however, that the appended drawings illustrate only typical embodiments of this invention and are therefore not to be considered as limiting of its scope. One skilled in the art will understand that the invention may be practiced without some of the details included in order to provide a thorough enabling description of such embodiments. Well-known structures and functions have not been shown or described in detail to avoid unnecessarily obscuring the description of the embodiments.

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "couple," "coupled," "couples." "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

A description of an embodiment of a method and system for global networking and communication is now described followed by a discussion of the operation of various components within the system. In this regard, FIG. 1 is a block diagram of a networked environment in which an exemplary embodiment of a system for multi-lingual networking and communication. As shown in FIG. 1, system 100 comprises a plurality of mobile devices. By way of example, and not limitation, three mobile devices 102, 104, and 106 are shown communicatively coupled via a communication network 108. Each of the mobile devices may be embodied as a mobile computing device such as, for example and without limitation, a smartphone that incorporates cellular telephone functionality. Notably, the communications network can use one or more of various communications types such as, for example and without limitation, cellular and Wi-Fi communications.

Users of mobile devices 102, 104 and 106 may use their devices to become members of a social network that enables them to interact with each other using their own respective mobile devices 102, 104 and 106 and exchange information. Indeed, it is contemplated that in some embodiments, more than four billion individuals speaking at least the most popular 41 languages across the globe may choose to join the social network to interact with each other.

In this exemplary embodiment, the social network is facilitated by a website that is hosted by a social network server. As such, the server facilitates interaction among the members of the social network 110. For the purpose of the example presented in FIG. 1, the members of the social network are the users of mobile devices 102, 104 and 106.

With reference to FIGS. 2A-D and 3A-C, one embodiment the system and method allows individual social network users to filter others in the social network according to various individual information supplied by each member of the social network. With reference to FIGS. 2A-2D in particular, each user of the social network may be instructed via an interactive interface displayed on his or her own mobile electronic device to provide information identifying him or herself for other social network users. Such information may be saved for each individual user as a "user profile" searchable to all other social network users. In some embodiments, the user profile or individualized information comprises such information as each user's name, date of birth, location, preferred language, and gender, as demonstrated in FIG. 2A. Further identifying or personal information may also be included though. For example, in FIG. 2B it may be seen that the interface may provide a user with the opportunity to indicate an interest in various sports, political views, hobbies, music, movies, collections, and even whether or not the user has pets.

Of course, the variety, specificity, and breadth of such individualized information may vary, and the foregoing is offered by way of example only and not of limitation. Such individualized information may be compulsory, voluntary or even some combination of the two, and a user may even be given the opportunity to fill out as much or as little of any non-compulsory individualized information with as much detail as he or she likes. For example in FIG. 2C, it may be seen that each category of individualized information, here a category indicating whether or not a user has pets, may provide any number of types within the category which a user may select with a check mark. Of course one skilled in the art will recognize that the interface may be arranged in various ways to effectively receive and store user information. In the figures provided, each category of selections is shown as a succession of screen shots, however, the same may be effected by a continuously scrolling page, a variety of drop down menus, among other interface features. In any event, any of the individualized information selected by a user may be collected and displayed on a user page or other profile as in FIG. 2D so that the user may be identifiable and discoverable to other users.

Figure 3C:
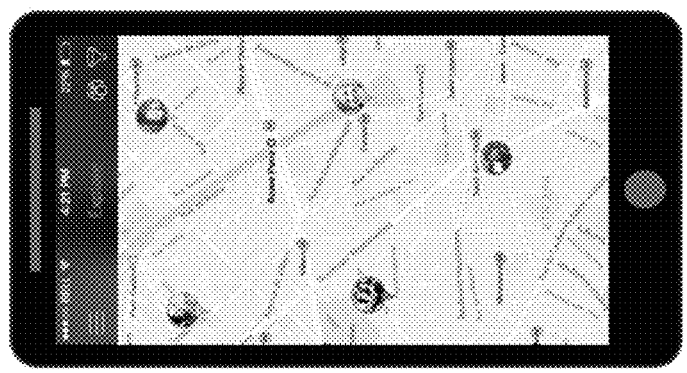
FIGS. 3A-C illustrate additional exemplary user interfaces implemented by the mobile electronic devices shown in FIG. 2.
Figure 3B:
Figure 3A:

Next, and with reference to FIGS. 3A-C, the system may receive instructions to filter the social network and display only those members who have indicated certain individualized information to other searching users. For example, FIG. 3A shows a series of photos which may be user profile pictures. A searching user may click on a photo to navigate to a user page like that shown in FIG. 2D. Navigating in this manner may then allow the searching user to view the photographed user's individualized information to determine whether he or she would like to begin a chat or virtual conversation. As another example, FIG. 3B shows a portion of a map of the world with indicators demonstrating the number of social network users whose individualized information indicates that they live or are within a certain geographical area. As may be seen, the geographical region may be as wide as several continents shown in FIG. 3B or even as narrow as several city blocks as FIG. 3C. A searching user may then choose to view the profile and individualized information of other users within such specified locations and then determine whether he or she would like to begin a chat or virtual conversation with such users.

Other methods of filtering may also be provided. For example, a searching user may choose through drop down boxes or other interface features to filter all other social network users by a specified age or age range, gender, sexual orientation, relationship and/or familial status, from a particularized geographical location or region, holding specified religious and/or political beliefs, having attained a certain level of education, or even with a specific career, hobbies, interests, and more.

Having filtered members of the social network according to instructions received from an individual social network member, the system may then receive instructions to transmit messages from the individual to one or more of the filtered members, as in an instant message or chat room. It is contemplated that such filtering may be performed, and thus such chat rooms may be formed, regardless of any personal acquaintance between the user and filtered members. Of course, it is even further contemplated that the system may present social network members with pre-formed chat rooms. For example, the system may receive instructions from social network members electing to join a chat room relating to a newsworthy event. As another example, the system may receive instructions from social network members electing to join a chat room relating to a celebrity.

It should be noted that one skilled in the art will recognize that the specificity of such network filtering and even chat room topic may vary. Indeed the system may receive instructions to filter the social network very narrowly, very broadly, or to some intermediary extent. One skilled in the art will further recognize that such a filtering process may be displayed by the mobile device in various manners. For example, the results of the filtering process may be displayed as a grid, list, or even map. The mobile electronic device may even be operative to alter the display according to preferences received from a each individual social network member. As such, the foregoing is offered simply by way of example and not of limitation.

Additionally, server 100 implements the system for multi-lingual networking and communication and facilitates sharing information related to visits with the network center amongst members of the social network. Specifically, the server 100 implements the steps outlined in FIGS. 4 and 5. Accordingly, individual members of the social network can access the server 100 using their respective mobile devices 102, 104, and 106 and can obtain information regarding other network members and filter such members according to their interests.

Figure 4:
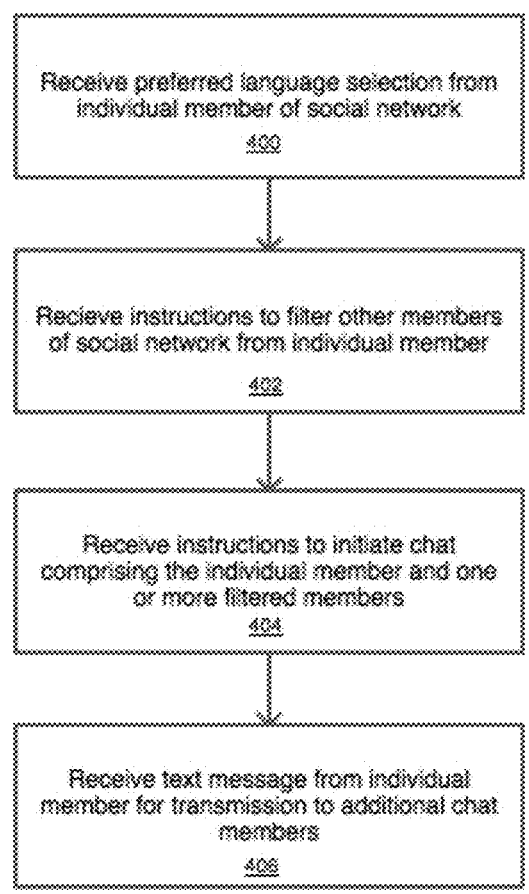
FIG. 4 is a flowchart depicting an exemplary embodiment of a method for global networking and communication may be performed by the system shown in FIG. 1.

In order to facilitate the aforementioned functionality, various aspects may be performed by one or more of the mobile devices 102, 104 and 106. In one embodiment, mobile device is operative to perform, at least in part, the method depicted in the flowchart of FIG. 4, depicting an exemplary embodiment of a system and method for multi-lingual networking and communication as may be performed by mobile device 102 104, and 106 of FIG. 1. As shown in FIG. 4, the method includes the steps of: receiving a preferred language selection from each individual member of the social network (block 400); receiving instructions from an individual member of the social network to filter the other members of the social network (block 402); receiving instructions to initiate a chat comprising the individual member and one or more filtered members (block 404); and receiving text messages from the individual member for transmission to the additional chat members (block 406).

In may be noted that individuals may become members of the social network by using their mobile device to access one way to add a member to a social network by using their device 102 to send an invitation to another user's device 104 inviting them to join the network 110. Sending a network invitation to another member will prompt them to enter identification information such as, by way of example, name and email address. Upon complying with the membership requirements, the new member will be given access, using their mobile device 104, to all of the privileges enjoyed by the first member on their device 102.

In this regard, mobile devices 102, 104 and 106 include embodiments of the system for multi-lingual networking and communication 100, which can be implemented in numerous ways such as, for example and without limitation, an application executed on the mobile device. In operation, the system 100 receives member information to uniquely identify members of the social network 110 (in this case, users of mobile devices 102, 104 and 106). Additionally, system 100 receives information corresponding to the preferred language of each individual user. In one embodiment, this information may be collected by a mobile device 102, 104 or 106 from integrated positioning technology, such as a Global Positioning System (GPS) allowing the system 100 to determine preferred language based on the language most commonly associated with a particular geographical location. However, it should be noted that various methods of determining a user's preferred language may be determined. In particular, the system 100 may cause the mobile device to prompt a user to manually indicate which language he or she prefers to communicate in.

The aforementioned functions can be performed by various components in various embodiments. For example, the functionality can be highly distributed across a network or less so by use of functions performed on local devices such as 102, 104 and 106.

With reference now to FIGS. 5 and 6A-C, in addition to filtering social network members, the system and method may provide automatic and real-time translation of any text or messages conveyed over the social network in instant messages or chat rooms so that each member may easily communicate with each other member regardless of any language barriers known to be encountered social networks and other forums for communication.

Figure 5:
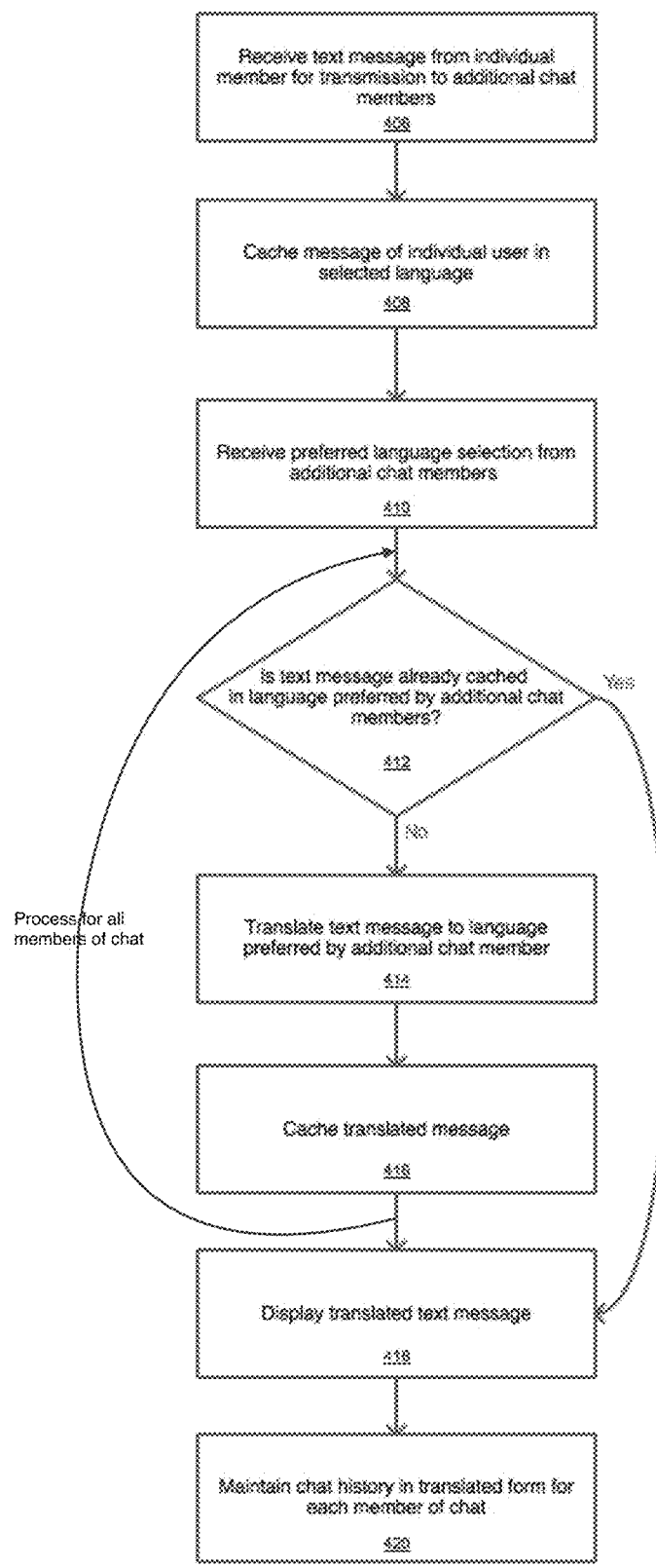
FIG. 5 is a flowchart further depicting the translation step illustrated in FIG. 4.

With reference to FIG. 5 in particular, the server 100 of FIG. 1 may further implement the steps outlined in FIG. 5, which continues from block 406 in FIG. 4, to effect translation. Such method may include the steps of: receiving a text message from an individual chat member, or participant, for transmission to additional chat members, or participants (block 406); caching the message of the individual chat member in the language selected indicated by that user in his or her individualized information (block 408); receiving preferred language selections from any additional chat members or participants (block 410); determining whether the text message is already cached in the language preferred by the additional chat members or participants (block 412); translating the message into the language preferred by an additional chat member (block 414); caching the translated message to aid future translation (block 416); displaying translated text messages (block 418); and maintaining a chat history in translated form for each member of the chat (block 420). The steps relating to blocks 412, 414, and 416 may even be performed repeatedly so that a text message is translated for each member or participant in the chat.

In an embodiment, when a mobile device receives instructions to transmit a text-based message from the first participant, the mobile device may determine whether the preferred language of any additional, or receiving, participants is the same as or different from the language preferred by the first participant. In accordance with the example given, the mobile device may determine that the second participant's preferred language is different than that of the first participant's. In such a case, the mobile device may be operative to translate the first participant's message into the language preferred by the second participant so that when the second participant receives the transmitted message, it may be displayed in a language that he is capable of understanding. Of course, one skilled in the art will recognize that translation may occur so that a third participant, fourth participant, and any other participants each receive a message displayed in their own preferred language. Likewise, when the first participant receives a message from any other participants in a chat room, the message displayed by his own mobile electronic device may be in his own preferred language so that he is capable of understanding messages transmitted by others regardless of their own preferred languages.

With respect to the translating step in particular, the mobile electronic device may be operative to determine which languages are preferred by each participant in a given chat room. For example, a chat room may comprise three members U1, U2, and U3, demonstrated individually and respectively as FIGS. 6A, 6B, and 6C. Of course the chat room may comprise fewer or more members, depending on the particular filtering parameters selected by each chat room member or on any other desires of each chatting member. Some, for example, may arbitrarily or otherwise determine that they may wish to participate in larger or smaller chat rooms for any number of reasons. Thus it will be apparent to one skilled in the art that the number of participants and individualized information unique to each participant does not limit practice of the invention. Such qualifiers are provided here by way of example only to aid enablement of the invention.

In one embodiment, each chat room participant U1, U2, U3 may have indicated a different preferred language as part of their individualized information. As such, the mobile device respective to each user may determine that the individual information supplied by it's respective user indicates a particular preferred language, and as a result, display all information provided through the social network in that language. This may even include text messages sent by other users who have indicated a different preferred language than the viewing user. To illustrate this, a first chat room participant U1 may have instructed the system that that his preferred language is English. This may be demonstrated by the English language displayed on the interface associated with the first participant U1 in FIG. 6A. Likewise, individual information supplied by a second chat room participant U2 may indicate that the second participant's U2 preferred language is Spanish. Thus, Spanish language messages are displayed on the interface associated with the second participant U2 in FIG. 6B. Again similarly, the individual information supplied by a third chat room participant U3 may indicate that the third participant's U3 preferred language is French so that any messages displayed on the interface associated with the third participant U3 are in French in FIG. 6C, regardless of the preferred language indicated by any other participants. Of course, such individual information is offered by way of example only and not by limitation. The languages preferred by each member may be those other than or including English, Spanish, and French. Indeed, some members may even share a preferred language.

Figure 6C:
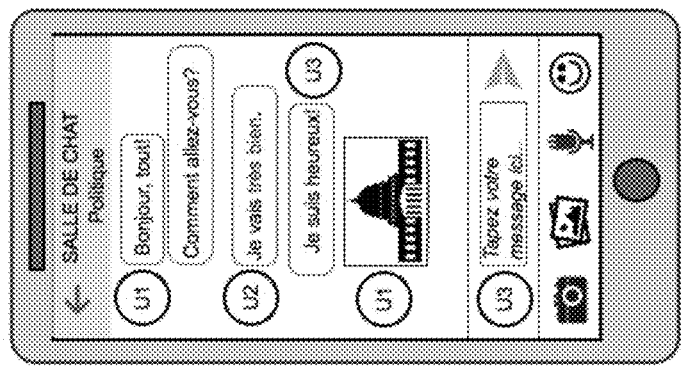
FIGS. 6A-C illustrate exemplary user interfaces implementing the portion of the method for global networking and communication shown in FIG. 5.
Figure 6B:
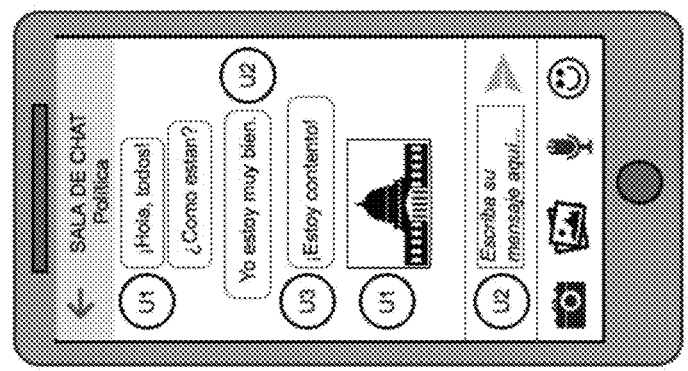
Figure 6A:
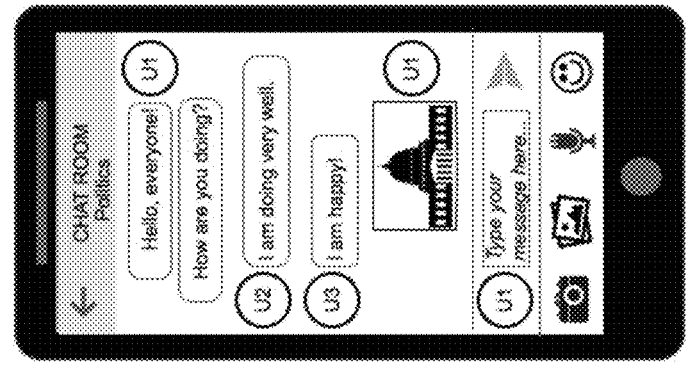

In an embodiment, each user may be provided a text box instructing them to "type your message here" or some synonymous variation of the same. In the exemplary FIGS. 6A-6C, it may be seen that such instructions are provided in English, French, and Spanish depending on the language preferred by each individual user. Thus in FIG. 6A, the instructions are provided in English. In FIG. 6B, the instruction to "Escriba su mesanje aqui" is provided in Spanish, and in FIG. 6C, the instruction to "Tapez votre message ici" is provided in French. The same may be said of the conversation that all chat members are commonly participating in. For example, each chat participant U1, U2, U3 is sending and receiving text messages in a chat room (alternatively labeled "sala de chat" or "salle de chat" depending on each participants' preferred language in the provided example) relating to politics. The messages displayed on each user's interface have the same meaning for each user, but are displayed in a manner understandable to each individual participant. That is, although a user may type and send a message in his or her own language, the message that is ultimately sent to other chat participants may be displayed in each receiving participant's language so that he or she may more easily comprehend the message. It is contemplated that displaying each message in a manner understandable to each user may easily facilitate global communication independent of a need for inefficient and even inaccurate translation by each participant who might receive messages in a language they do not understand.

In some embodiments, translated text and messages may be cached and stored in an electronic memory to facilitate translation of future, similar messages. When a mobile device receives instructions, for example, to send a message which is already stored in the cache and translated into the language preferred by any receiving participants, the translating step may be entirely passed over, and the cached translation of the message may be sent.

Figure 7:
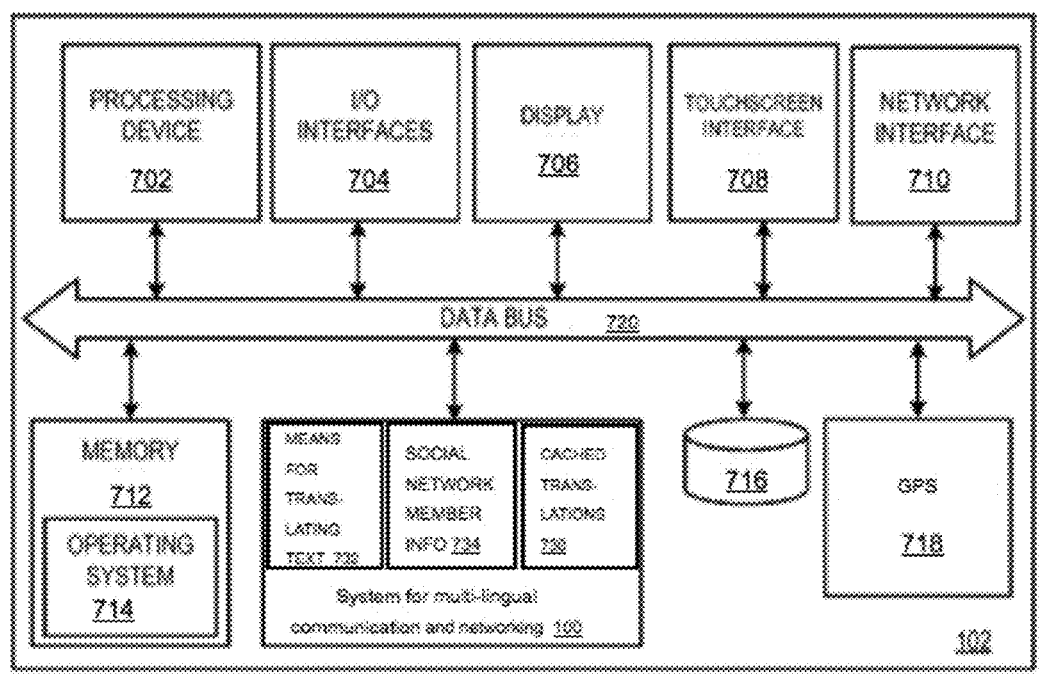
FIG. 7 illustrates an exemplary embodiment of a mobile device shown in FIG. 1.

FIG. 7 illustrates mobile device 102 shown in FIG. 1. As described earlier, mobile device 102 may be a tablet computer or smartphone but may also be embodied in any one of a wide variety of wired and/or wireless computing devices. As shown in FIG. 7 mobile device 102 includes a processing device (processor) 702, input/output interfaces 704, a display 706, a touchscreen interface 708, a network interface 710, a memory 712, and operating system 714, a mass storage 716 and an GPS 718, with each communicating across a local data bus 720. Additionally, mobile device 102 incorporates a system for multi-lingual networking and communication 100, which is depicted as including means for translating text 732, social network member information 734, and cached translations of previously transmitted messages 736, although the location of information 732, 734 and 736 could vary.

The processing device 702 may include any custom made or commercially available processor, a central processing unit (CPU) or an auxiliary processor among several processors associated with the mobile device 102, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

The memory 712 can include any one of a combination of volatile memory elements (e.g., random-access memory (RAM, such as DRAM, and SRAM, etc.)) and nonvolatile memory elements. The memory typically comprises native operating system 714, one or more native applications, emulation systems, or emulated applications for any of a variety of operating systems and/or emulated hardware platforms, emulated operating systems, etc. For example, the applications may include application specific software which may comprise some or all the components of the mobile device 102. In accordance with such embodiments, the components are stored in memory and executed by the processing device. Note that although depicted separately in FIG. 7, the system for multi-lingual networking and communication 100 may be resident in memory such as memory 712.

Touchscreen interface 708 is configured to detect contact within the display area of the display 706 and provides such functionality as on-screen buttons, menus, keyboards, etc. that allows users to navigate user interfaces by touch. For some embodiments, the mobile device 102 will comprise GPS 718 or other means to determine the location of the mobile device 102.

One of ordinary skill in the art will appreciate that the memory 714 can, and typically will, comprise other components which have been omitted for purposes of brevity. Note that in the context of this disclosure, a non-transitory computer-readable medium stores one or more programs for use by or in connection with an instruction execution system, apparatus, or device. With further reference to FIG. 7, network interface device 710 comprises various components used to transmit and/or receive data over a networked environment such as depicted in FIG. 1. When such components are embodied as an application, the one or more components may be stored on a non-transitory computer-readable medium and executed by the processing device.

If embodied in software, it should be noted that each block depicted in the accompanying flowcharts represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as the mobile device 102, 104, and 106. The machine code may be converted from the source code, etc. If embodied in hardware, each block may represent a circuit or a number of interconnected circuits to implement the specified logical function(s). Additionally, although the flowcharts show specific orders of execution, it is to be understood that the orders of execution may differ.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. For example, chat rooms may be established between strangers and acquaintances alike. More selective communication experiences are also contemplated. In one embodiment, various bars to entry in certain chat rooms may be implemented to limit the number of participants. For example, the system may provide social network members with the opportunity to subscribe to elite chat rooms with celebrities, athletes, and musicians in a multimedia chat room displayed for each individual member in his or her preferred language. Other embodiments of the system and method may comprise a mobile device operative to analyze each member's individualized member information to determine a particular level of social and/or romantic compatibility between or among social network members.

Accordingly, it is intended that the invention not be limited, except as by the appended claim(s).

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the system and method for multi-lingual networking and communication with which that terminology is associated. In general, the terms used in the following claims should not be constructed to limit the system and method for multi-lingual networking and communication to the specific embodiments disclosed in the specification unless the above description section explicitly define such terms. Accordingly, the actual scope encompasses not only the disclosed embodiments, but also all equivalent ways of practicing or implementing the disclosed system and method. The above description of embodiments of the system and method for multi-lingual networking and communication is not intended to be exhaustive or limited to the precise form disclosed above or to a particular field of usage.

While specific embodiments of, and examples for, the method and system are described above for illustrative purposes, various equivalent modifications are possible for which those skilled in the relevant art will recognize.

While certain aspects of the method and system disclosed are presented below in particular claim forms, various aspects of the method and system are contemplated in any number of claim forms. Thus, the inventor reserves the right to add additional claims after filing the application to pursue such additional claim forms for other aspects of the system and method for multi-lingual networking and communication.

What is claimed is:

1. A system for multi-lingual networking and communication, comprising:
   a first mobile device having a GPS-enabled map function and a screen, wherein the first mobile device is operative to:
   a) receive individualized information corresponding to a plurality of members in a social network, wherein the individualized information comprises at least each member's location, each member's preferred language, whether or not each member is logged in, and one or more elements of each member's biographical information;
   b) use the GPS-enabled map function to display an interactive map configured to enable a user to select an area of the interactive map, wherein the user is a member of the social network;
   c) receive a user selection of an area of the interactive map;
   d) display any logged-in member having a GPS location within the user-selected area of the interactive map;
   e) receive a user selection of at least one member within the user-selected area of the interactive map, wherein the user selection of at least one member designates at least one selected member;
   f) receive a user input from the user, wherein the user input is configured to communicate a desire to directly engage the at least one selected member in communication, wherein the at least one selected member is not the user;
   g) transmit the user input to a cloud-based server;
   h) receive at least one selected member input in response to the user input; and
   i) automatically display each of the at least one selected member input on the user's mobile device screen in the user's preferred language; and
   a cloud-based server operative to:
   a) receive the user input;
   b) translate the user input into a translated user input, wherein the translated user input comprises the user input translated into the preferred language of each of the at least one selected member;
   c) transmit the translated user input to at least one second mobile device associated with one of the at least one selected member;
   d) receive at least one selected member input;
   e) translate the at least one selected member input into at least one translated selected member input, wherein the at least one translated selected member input comprises the at least one selected member input translated into the preferred language of the user; and
   f) transmit the at least one translated selected member input to the first mobile device; and
   at least one second mobile device having a screen, wherein the at least one second mobile device is operative to:
   a) receive the at least one translated user input from the cloud-based server;
   b) display the at least one translated user input on the second mobile device screen;
   c) receive at least one selected member input, wherein the at least one selected member input comprises at least one response entered in the preferred language of the at least one selected member; and
   d) transmit the at least one selected member input to the cloud-based server.

2. The system of claim 1, wherein the first mobile device is further operative to:
   present at least one list of selected members, wherein the at least one list of selected members comprises at least one logged in member having a GPS location within the selected area of the map.

3. The system of claim 2, wherein the user selection is made from the list.

4. The system of claim 1, wherein the first mobile device is further operative to filter out at least one member from within the selected area, wherein the filtered-out member has a different preferred language than the preferred language of the user.

5. The system of claim 1, wherein the first mobile device is further operative to filter out at least one member from within the selected area, wherein the filtered-out member is a member with whom the user has previously directly engaged.

6. The system of claim 2, wherein the first mobile device is further operative to cache at least one list.

7. The system of claim 1, wherein the first mobile device is further operative to cache at least one translated user input.

8. The system of claim 1, wherein the first mobile device is further operative to cache at least one translated selected member input.

9. The system of claim 1, wherein the cloud-based server is further operative to:
  link the plurality of members of the social network; and
  facilitate each of the operations performed by the first mobile device and the at least one second mobile device.

10. A method for multi-lingual networking and communication, comprising:
  at a first mobile device having a GPS-enabled map function and a screen:
  a) receiving individualized information corresponding to a plurality of members in a social network, wherein the individualized information comprises at least each member's location, each member's preferred language, whether or not each member is logged in, and one or more elements of each member's biographical information;
  b) using the GPS-enabled map function to display an interactive map configured to enable a user to select an area of the interactive map, wherein the user is a member of the social network;
  c) receiving a user selection of an area of the interactive map;
  d) displaying any logged-in member having a GPS location within the user-selected area of the interactive map;
  e) receiving a user selection of at least one member within the user-selected area of the interactive map, wherein the user selection of at least one member designates at least one selected member;
  f) receiving a user input from the user, wherein the user input is configured to communicate a desire to directly engage at least one selected member in communication, wherein the at least one selected member is not the user;
  g) transmitting the user input to a cloud-based server;
  h) receiving at least one selected member input in response to the user input; and
  i) automatically displaying each of the at least one selected member input on the user's mobile device screen in the user's preferred language; and
  at a cloud-based server:
  a) receiving the user input;
  b) translating the user input into a translated user input, wherein the translated user input comprises the user input translated into the preferred language of each of the at least one selected member;
  c) transmitting the translated user input to at least one second mobile device associated with one of the at least one selected member;
  d) receiving at least one selected member input;
  e) translating the at least one selected member input into at least one translated selected member input, wherein the at least one translated selected member input comprises the at least one selected member input translated into the preferred language of the user; and
  f) transmitting the at least one translated selected member input to the first mobile device; and
  at at least one second mobile device having a screen:
  a) receiving the at least one translated user input from the cloud-based server;
  b) displaying the at least one translated user input on the second mobile device screen;
  c) receiving at least one selected member input, wherein the at least one selected member input comprises at least one response entered in the preferred language of the at least one selected member; and
  d) transmitting the at least one selected member input to the cloud-based server.

11. The method of claim 10, further comprising the step of, at the first mobile device:
  presenting at least one list of selected members, wherein the at least one list of selected members comprises at least one logged in member having a GPS location within the selected area of the map.

12. The method of claim 11, further comprising the step of, at the first mobile device:
  receiving a user selection from the list.

13. The method of claim 10 further comprising the step of, at the first mobile device:
  filtering out at least one member from within the selected area, wherein the filtered-out member has a different preferred language than the preferred language of the user.

14. The method of claim 10, further comprising the step of, at the first mobile device:
  filtering out at least one member from within the selected area, wherein the filtered-out member is a member with whom the user has previously directly engaged.

15. The method of claim 10, further comprising the step of, at the first mobile device:
  caching at least one list.

16. The method of claim 10, further comprising the step of, at the first mobile device:
  caching at least one translated user input.

17. The method of claim 10, further comprising the step of, at the first mobile device:
  caching at least one translated selected member input.

18. The method of claim 10, further comprising the steps of, at the cloud-based server:
  linking the plurality of members of the social network; and
  facilitating each of the operations performed at the first mobile device and at the at least one second mobile device.

* * * * *